June 24, 1924.

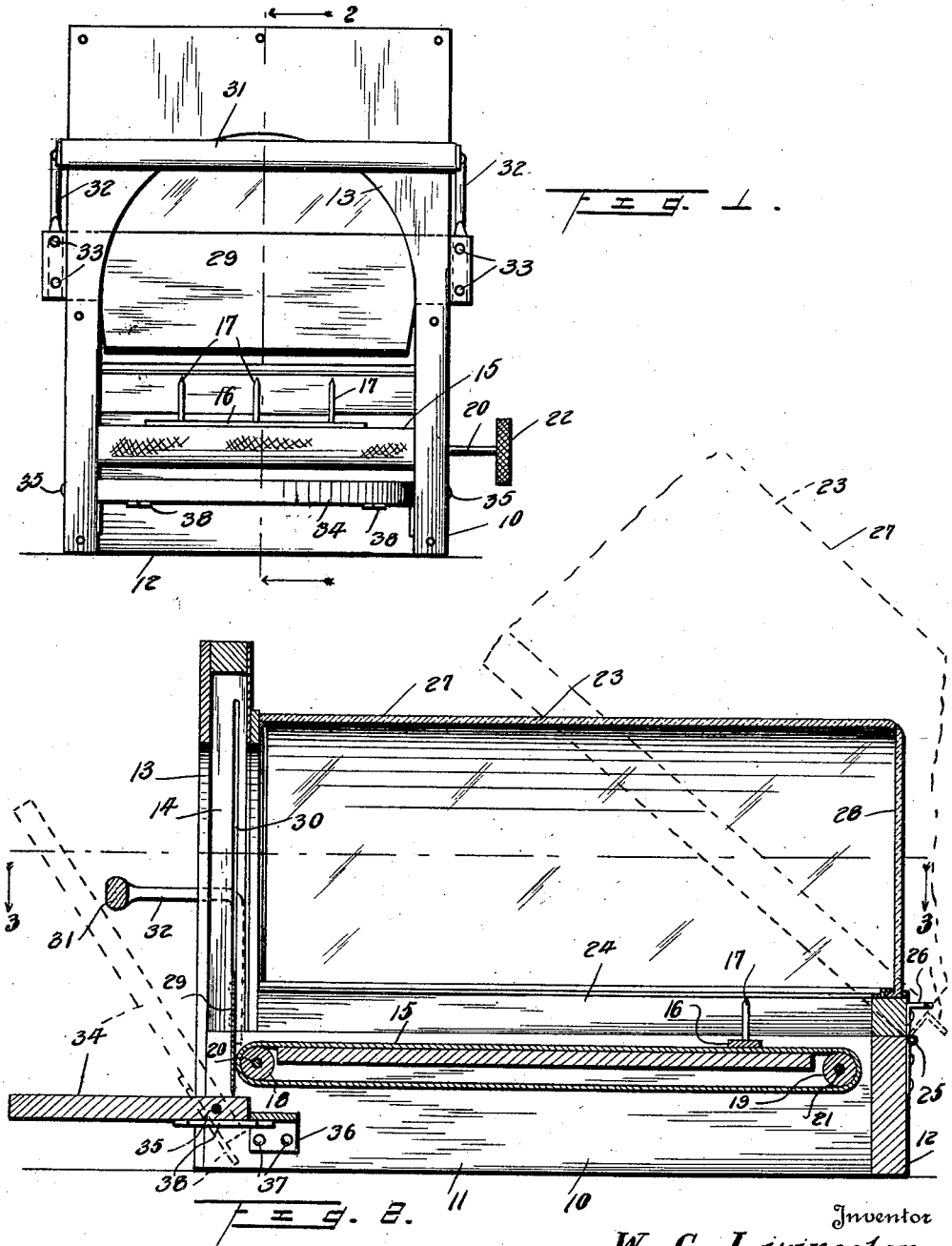

W. C. LIVINGSTON

CHEESE CUTTER

Filed April 12, 1923   2 Sheets-Sheet 2

1,499,235

Inventor
W. C. Livingston,
By
Attorney

Patented June 24, 1924.

1,499,235

UNITED STATES PATENT OFFICE.

WILLIAM C. LIVINGSTON, OF NEWTON, KANSAS.

CHEESE CUTTER.

Application filed April 12, 1923. Serial No. 631,630.

*To all whom it may concern:*

Be it known that I, WILLIAM C. LIVINGSTON, a citizen of the United States, residing at Newton, in the county of Harvey and State of Kansas, have invented certain new and useful Improvements in Cheese Cutters; and I do hereby declare the following to be a full, clear, and exact description of the invention, such as will enable others skilled in the art to which it appertains to make and use the same.

This invention relates to a cheese cutter.

It is aimed to generally improve, simplify and render more efficient, a practical cheese cutting machine and particularly one adapted to cut cheese of the type manufactured in cylindrical or longhorn shape.

It is particularly aimed to provide a construction in which a closure or end cover may serve also as a table to receive the slices of cheese as the same is cut, and further to provide a closure and the cutter of a coacting construction in order that the cutter will normally prevent opening of the closure.

It is also aimed to provide a novel construction in which the cheese may be advanced or efficiently fed with respect to the cutter or knife.

Another object is to provide a novel construction wherein an upstanding front frame is used to mount the cutter or knife and to be normally closed by the said closure, and to have a cover in the rear thereof capable of opening to facilitate insertion and removal of cake cheese.

Various additional objects and advantages will become apparent from a consideration of the description following taken in connection with accompanying drawings illustrating an operative embodiment.

In said drawings:—

Figure 1 is an end elevation showing the closure or table lowered;

Figure 2 is a cross sectional view longitudinally of the machine taken on the line 2—2 of Figure 1 and suggesting lowering movement of the closure and opening movement of the cover;

Like reference characters designate like or similar parts in the different views.

Figure 3:
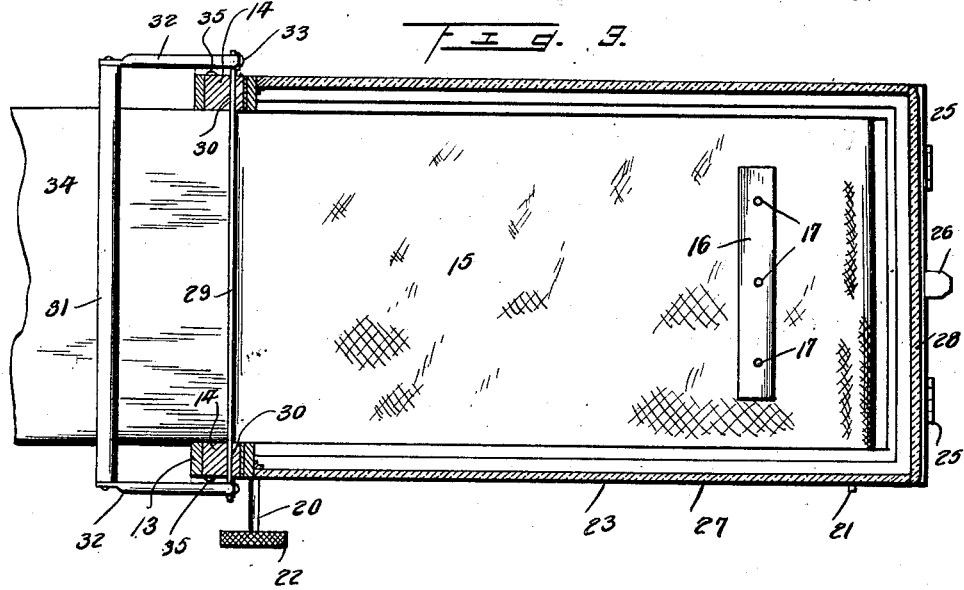
Figure 3 is a horizontal sectional view taken on the line 3—3 of Figure 2.
Figure 4:
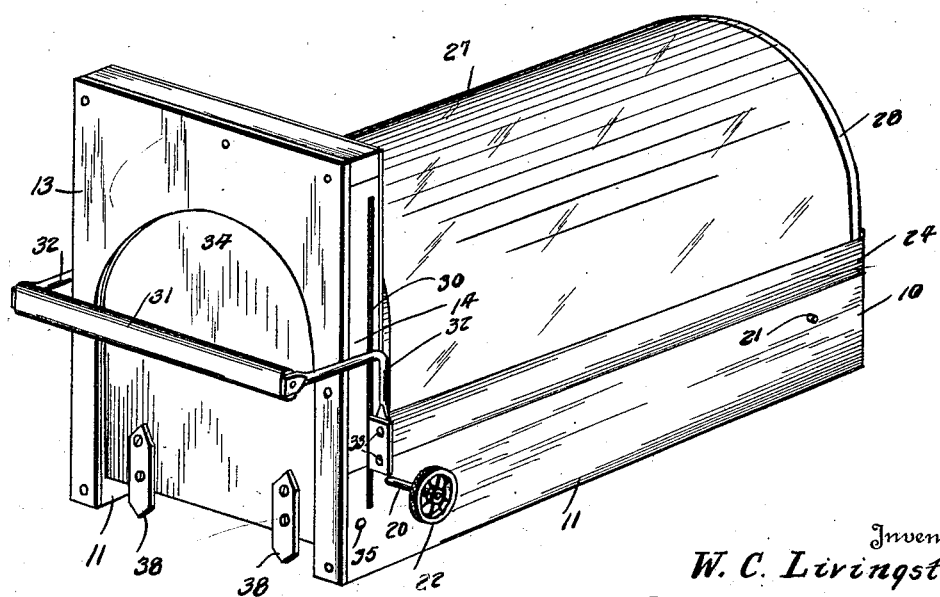
Figure 4 is a perspective view of the device showing the same as closed.

Referring specifically to the drawings, a suitable base is provided as at 10 which may consist of side members 11 and a rear end member 12. At the front an arch-shaped frame 13 is provided having uprights 14 connected to the upper edges of the side members 11.

Cheese is adapted to rest on an endless belt, preferably relatively wide and for instance of canvas and as suggested at 15. This belt if desired may have a flight 16 secured thereto from which spurs 17 extend in order to penetrate the cheese and effect a positive engagement between the same and belt 15. The upper run of belt 15 is disposed slightly below the upper edges of the side members 11 and such belt is trained over rollers 18 and 19 at the front and rear ends, respectively. These rollers are respectively carried by shafts 20 and 21 journaled in the side members 11. Shaft 20 is extended so as to, exteriorly of the base 10, accommodate an operating handle or knob 22. Intermediate the rollers 18 and 19 and surrounded by the belt 15 so that its upper surface will be engaged by the upper run of the belt, is a filler board which spans and is fastened to the side members 11.

A suitable cover 23 is adapted for disposition normally over the cheese or material to be cut. This cover may have a frame 24 which is pivoted at its rear end as at 25 to the end member 12 as by means of hinges. In the open position of the cover 23, the frame 24 may engage the end member 12, as through a lug 26 carried by the frame 24, to limit the opening movement of the frame. Said frame is open at the front and at the top has an arched transparent panel 27 and at the rear has an end panel 28. The panels 27 and 28 are preferably of glass but may be made of any suitable material and in one or two pieces as desired.

A blade or cutter 29 is vertically slidable in slots 30 provided in the uprights 14. An operating handle 31 is disposed in front of the frame 13 and has L-shaped brackets 32 extending therefrom with their lower arms detachably bolted or otherwise fastened as at 33 to portions of the cutter 29 projecting outwardly beyond said uprights 14.

A combined table and closure, of suitable shape is provided at 34 and adapted to normally close the opening of the arch frame 13. This table and closure 34 adjacent its base is pivoted to the side members 11 by pins or the equivalent 35. As the handle 31 travels with the cutter, it will be noted that in the lowered position of the cutter and handle, that such handle is below the upper edge of closure 34 and thus the latter cannot be moved outwardly. However, when the cutter and handle 31 are raised, the closure 34 may be freely swung to a horizontal position or if sufficiently loose at its pivots 35 will automatically fall to that position.

Adjacent the front of the base 10 and below belt 15, a bracket 36 spans and is secured to the side members 11 as at 37. Cleats 38 may be fastened to the closure 34 and in the lowered position of the latter such cleats may engage the under surface of the bracket 36 to thereby maintain and support closure 34 in horizontal position.

In use, the cheese is completely enclosed as the cover 23 is in lowered position and the closure 34 is in closed position, being incapable of opening due to the disposition of the handle 31 in its path of movement. When it is desired to cut the cheese, the handle 31 is raised which correspondingly raises the cutter 29 and thus the closure 34 is released so that it falls downwardly to horizontal position, being limited in movement to that position by engagement of cleats 38 with the bracket 36. The position of the cheese may be readily observed through the panel 27. While the handle 31 is held in uppermost position by one hand, the other hand engages the knob 22 and turns it toward the cutter so as to move the belt 15 at its upper run and to correspondingly move the cheese toward and under the cutter 29 to the desired extent after which both hands are preferably engaged with handle 31 and forced downwardly in order to force the cutter 29 through the cheese and thus sever the desired portion. The cut portion of the cheese falls on to the closure 34 which thus serves as a table. This closure 34 or table is sufficiently large to enable the cheese to be wrapped in paper placed on the table to receive it before it is cut, if desired. The closure or table 34 is of such size as to function as an ordinary table or wrapping counter for the cheese.

The cake cheese may be placed in or removed from the device through the raising and lowering of the cover 23 as will be understood.

Changes in the details may be resorted to provided they fall within the spirit and scope of the invention.

I claim as my invention:—

1. A machine of the class described having a base, a frame rising therefrom, a cutter mounted on said frame, a closure foldably related to said base and frame and maintained folded by said cutter, and said base being capable of assuming a table position below the cutter when released by the latter.

2. A machine of the class described having a cutter, a closure for the machine foldably carried thereby, said closure constituting a table in its unfolded position, and the table being normally restrained from movement to unfolded position by the cutter.

3. A machine of the class described having a cutter, a closure for the machine foldably carried thereby, said closure constituting a table in its unfolded position, the table being normally restrained from movement to unfolded position by the cutter, and the cutter being movable to release said table for unfolding movement.

4. A machine of the class described having a vertically movable cutter, a closure foldably carried by the machine and adapted to constitute a table in unfolded position, and said table being overlapped by said cutter when the latter is in lowermost position.

5. A machine of the class described having a cutter, a closure foldably carried by the machine, said cutter being vertically slidable and having a handle, and said handle being disposed in the path of unfolding movement of said closure in the lowermost position of the cutter.

6. A machine of the class described having a base, a frame rising from the base, a closure pivoted to the base and associated with the frame, a cutter vertically slidable in the frame, and means carried by the cutter and in the lowermost position of the latter being disposed in the path of unfolding movement of said closure.

7. A machine of the class described having a base, a frame rising therefrom, a cutter, said frame being vertically slotted to accommodate movement of said cutter, a bracket extending from the cutter, an arm carried by the bracket, a closure pivoted to said base and adapted to constitute a table in its unfolded position, and said handle in the lowermost position of the cutter being disposed in the path of unfolding movement of the closure.

8. A machine of the class described having a base, said base having spaced side members, a cutter movable relatively to the base, a frame mounting said cutter, a closure for said frame pivoted to the base, a bracket connecting said side members, and means on the closure to engage said bracket to limit movement of the latter to a table position.

9. A machine of the class described having a base, a frame rising therefrom, a cutter mounted on said frame, and a cover pivoted to said base and adapted to assume a table position when opened.

10. A machine of the class described having a base, an arched frame rising therefrom, a cutter slidably mounted in said frame, L-shaped brackets detachably connected to said cutter beyond the frame, a handle joining said brackets in front of said frame, a closure for said frame pivoted to said base, said handle being in the path of folding movement of said closure, said closure in open position constituting a table, a cleat on said closure, a bracket on said base engageable by said cleat in its table position, a belt carried by said base to move material relatively to the cutter, rollers journaled on said base and over which said belt is trained, and a cover pivoted to said base and being engageable with said frame at its forward end.

In testimony whereof I affix my signature in presence of two witnesses.

WILLIAM C. LIVINGSTON.

Witnesses:
FLORENCE KIRK,
FRANK J. GLENN.